(12) United States Patent
Jensen

(10) Patent No.: US 8,430,126 B2
(45) Date of Patent: Apr. 30, 2013

(54) ROTARY DISTRIBUTION APPARATUS INCORPORATING INTERSTAGE PUMPS

(75) Inventor: Craig Jensen, La Lucia (ZA)

(73) Assignee: Tongaat Hulett Limited, Tongaat (ZA)

( * ) Notice: Subject to any disclaimer, the term of this patent is extended or adjusted under 35 U.S.C. 154(b) by 320 days.

(21) Appl. No.: 12/810,285

(22) PCT Filed: Mar. 5, 2009

(86) PCT No.: PCT/IB2009/050897
§ 371 (c)(1),
(2), (4) Date: Jun. 23, 2010

(87) PCT Pub. No.: WO2009/127978
PCT Pub. Date: Oct. 22, 2009

(65) Prior Publication Data
US 2011/0017302 A1 Jan. 27, 2011

(30) Foreign Application Priority Data
Apr. 14, 2008 (ZA) .................................. 2008/03281

(51) Int. Cl.
*F16K 11/074* (2006.01)
(52) U.S. Cl.
USPC ................ 137/625.15; 137/625.46; 73/61.56; 210/657
(58) Field of Classification Search ............. 137/625.11, 137/625.15, 625.46; 73/61.52, 61.55, 61.56; 210/656, 657, 660, 661; 417/244, 266, 515–517
See application file for complete search history.

(56) References Cited

U.S. PATENT DOCUMENTS

| 4,614,205 A * | 9/1986 | Oroskar .................... 137/625.11 |
| 4,915,843 A * | 4/1990 | Taniguchi et al. ............ 210/635 |
| 7,191,797 B2 * | 3/2007 | Jensen et al. .................. 137/580 |
| 2007/0068873 A1 * | 3/2007 | Oroskar et al. ............... 210/659 |

FOREIGN PATENT DOCUMENTS

JP   2000-162198   6/2000

* cited by examiner

*Primary Examiner* — John Fox
*Assistant Examiner* — Seth Faulb
(74) *Attorney, Agent, or Firm* — Kilpatrick Townsend and Stockton LLP

(57) ABSTRACT

The invention concerns a rotary distribution apparatus (30) for distributing process liquids, typically in ion exchange and chromatographic separation in the processing of sugar juice. The apparatus includes a core (2) into which fixed process liquid supply pipes (3) extend and annular fluid distribution chambers defined between the core and an outer shell (4) which rotates around the core. Rotating pipes (5) are provided which rotate with the shell and which are connected between selected distribution chambers and selected ports in a rotating indexing disc (6) which rotates, with the shell, relative to a stationary indexing disc (7). The arrangement is such that as the rotating disc rotates, different streams of process liquid streams fed to the rotating disc through the rotating pipes are introduced to fixed ports in the stationary disc. The latter ports are arranged to feed the streams selectively to selected destinations. According to the invention interstage pumps operating to pump the process liquids are mounted to rotate about the core with the rotating pipes and the rotating indexing disc. This leads to a particularly simple design compared to conventional simulated moving bed configurations with fixed pumps.

6 Claims, 4 Drawing Sheets

ROTARY DISTRIBUTION APPARATUS INCORPORATING INTERSTAGE PUMPS

CROSS REFERENCE TO RELATED APPLICATION DATA

The present application is a U.S. National Phase under 35 USC §371 of PCT/IB2009/050897filed 5 Mar. 2009, which application claims the benefit of priority from South African Patent Appln. No. 2008/03281 filed 14 Apr. 2008; the full disclosures of which are incorporated herein by reference in their entirety.

BACKGROUND TO THE INVENTION

THIS invention relates to a rotary distribution apparatus which incorporates interstage pumps.

WO 2004/029490 describes a rotary distribution apparatus (RDA) which allow batch processes to be conducted with an efficiency approaching that of continuous operation. The apparatus may for instance be used in ion exchange and chromatographic separation in, for example, the processing of sugar juice in a sugar extraction plant.

FIG. 1 illustrates a known RDA according to WO 2004/029490. The apparatus 1 has a stationary, cylindrical, central core 2 into which fixed feed and product pipes 3 extend. A set of annular fluid distribution chambers (not visible in FIG. 1) are defined between the core 2 and an outer shell or barrel 4 which rotates around the core with, in practice, one distribution chamber provided per feed or product stream. Pipes 5 which rotate with the shell 4 are connected between selected distribution chambers and selected ports in an indexing disc 6 which rotates with the shell. The disc 6 rotates relative to a stationary indexing disc 7. As the disc 6 rotates relative to the disc 7 different process streams fed to the former disc through the pipes 5 are introduced to fixed ports in the latter disc which in turn feed the streams selectively to process chambers, typically ion-exchange or chromatographic separation chambers in the case of sugar extraction, through pipes 8. Fluid streams which return from the process chambers follow similar routes in reverse and are eventually discharged from the apparatus through relevant ones of the fixed pipes 3.

In a chromatographic separation application, by way of example, the process fluids are required to pass through several process chambers containing resin, typically for regeneration of the resin. In some zones of the distribution system, the fluid viscosity can be quite high with the result that the associated pressure drops can be significant. This generally requires careful design of the pipes and associated pumping apparatus.

In a conventional simulated moving bed chromatographic separation system, as described for instance in U.S. Pat. No. 5,122,275 to Rasche (assigned to A.E Staley Manufacturing Company), the separation columns and necessary pumps are fixed in position while the actual separation profile moves from column to column. As the profile moves through the columns the fluid viscosities and hence the pumping duties vary significantly, which means that the capacities of the pumps must be carefully selected to handle the full range of fluid potential flows and pressure variations at all points in the cycle.

Where an RDA as referred to above is used the separation columns are fixed and an approach might be to provide an interstage pump at each column. This potential solution is however considered to be rather inefficient, as pumps may not be required at all in zones where the fluids have low viscosities. If, on the other hand, a smaller number of larger pumps is used, the pressure drops become more significant and at least some of the column chambers need to be of robust construction to withstand the applied pressures.

An added difficulty with such a solution is that the pumps would see different duties and have different flow setpoints after each index in the processing cycle.

These factors combine to make the overall pump control strategy very complex. This is a problem which the present invention seeks to overcome.

SUMMARY OF THE INVENTION

According to the invention there is provided a rotary distribution apparatus (RDA) for distributing process liquids, the apparatus comprising a stationary core into which fixed process liquid supply pipes extend, annular fluid distribution chambers defined between the core and an outer shell which rotates around the core, rotating pipes which rotate with the shell and which are connected between selected distribution chambers and selected ports in a rotating indexing disc which rotates, with the shell, relative to a stationary indexing disc, whereby as the rotating disc rotates, different streams of process liquid streams fed to the rotating disc through the pipes are introduced to fixed ports in the stationary disc which are arranged to feed the streams selectively to selected destinations, characterised in that interstage pumps operating to pump the process liquids are mounted to rotate about the core with the rotating pipes and the rotating indexing disc.

Advantageously the interstage pumps are arranged to pump process liquids through the rotating pipes. The interstage pumps are typically arranged in the rotating pipes. They may be driven by electrical motors provided with electrical current, from a current source, by a rotating slipring through contact brushes. Also advantageously there is a variable frequency drive unit associated with each electrical motor for controlling the speed of the associated pump. The variable frequency drive units are also arranged to rotate with the other rotating components of the RDA and are preferably controlled by a common electronic control unit.

According to another aspect of the invention there is provided a method of distributing process liquids for ion exchange or chromatographic separation in the processing of sugar juice in a sugar extraction plant, the method comprising distributing the process liquids using a rotary distribution apparatus comprising a core into which fixed process liquid supply pipes extend, annular fluid distribution chambers defined between the core and an outer shell which rotates around the core, rotating pipes which rotate with the shell and which are connected between selected distribution chambers and selected ports in a rotating indexing disc which rotates, with the shell, relative to a stationary indexing disc, whereby as the rotating disc rotates, different streams of process liquid streams fed to the rotating disc through the pipes are introduced to fixed ports in the stationary disc which are arranged to feed the streams selectively to selected destinations, characterised in that the method comprises the step of mounting interstage pumps to rotate with the rotating pipes and the rotating indexing disc and operating the pumps to pump the process liquids through the rotating pipes.

BRIEF DESCRIPTION OF THE DRAWINGS

The invention will now be described in more detail, by way of example only, with reference to the accompanying drawings in which.

DESCRIPTION OF A PREFERRED EMBODIMENT

Figure 1:
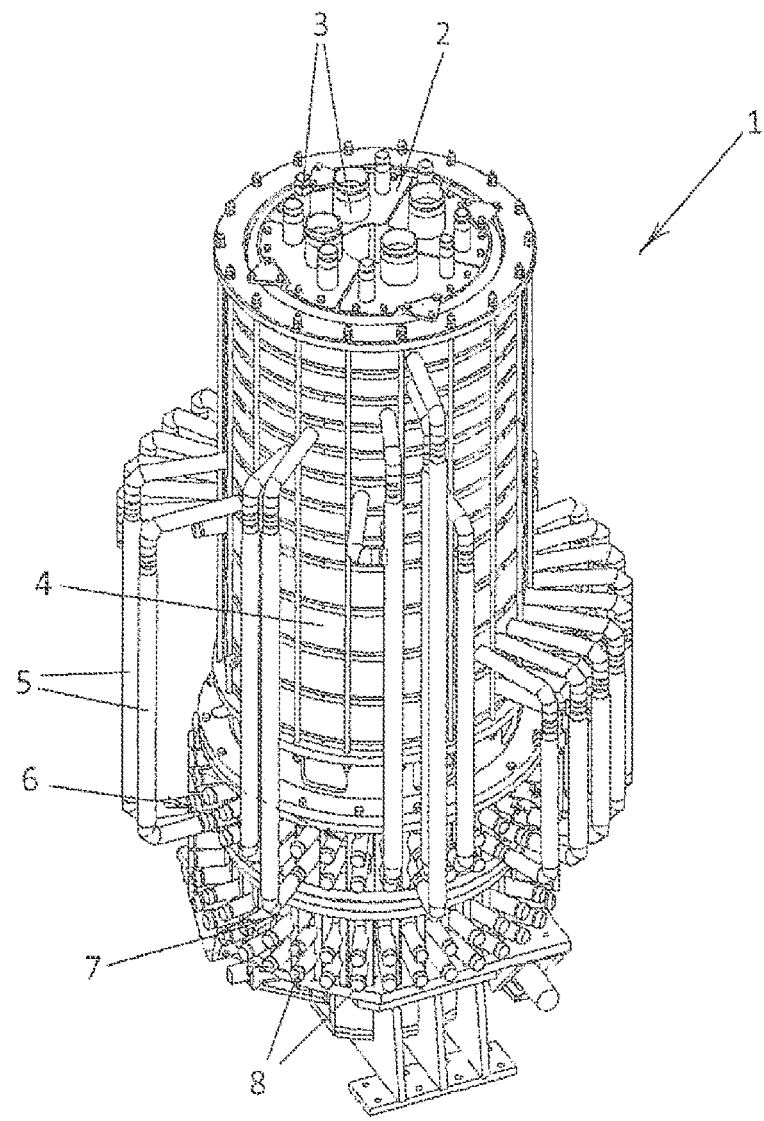
FIG. 1 illustrates a known rotary distribution apparatus (RDA)

Reference is made above to the RDA illustrated in FIG. 1. The apparatus of FIG. 1 is also described in more detail in WO 2004/029490 to which reference should be made.

Figure 2:
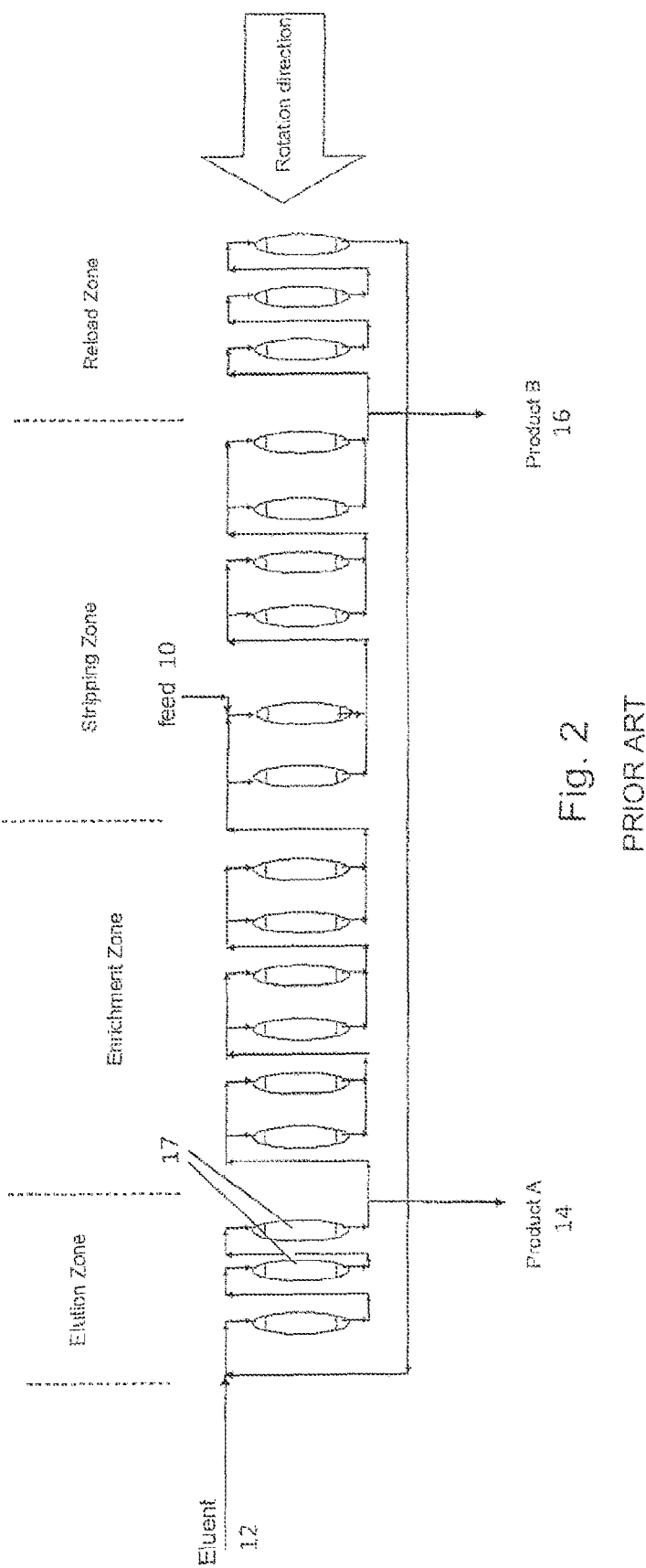
FIG. 2 diagrammatically illustrates a typical chromatographic separation process of the kind in which an apparatus according to the invention finds application.
Figure 3:
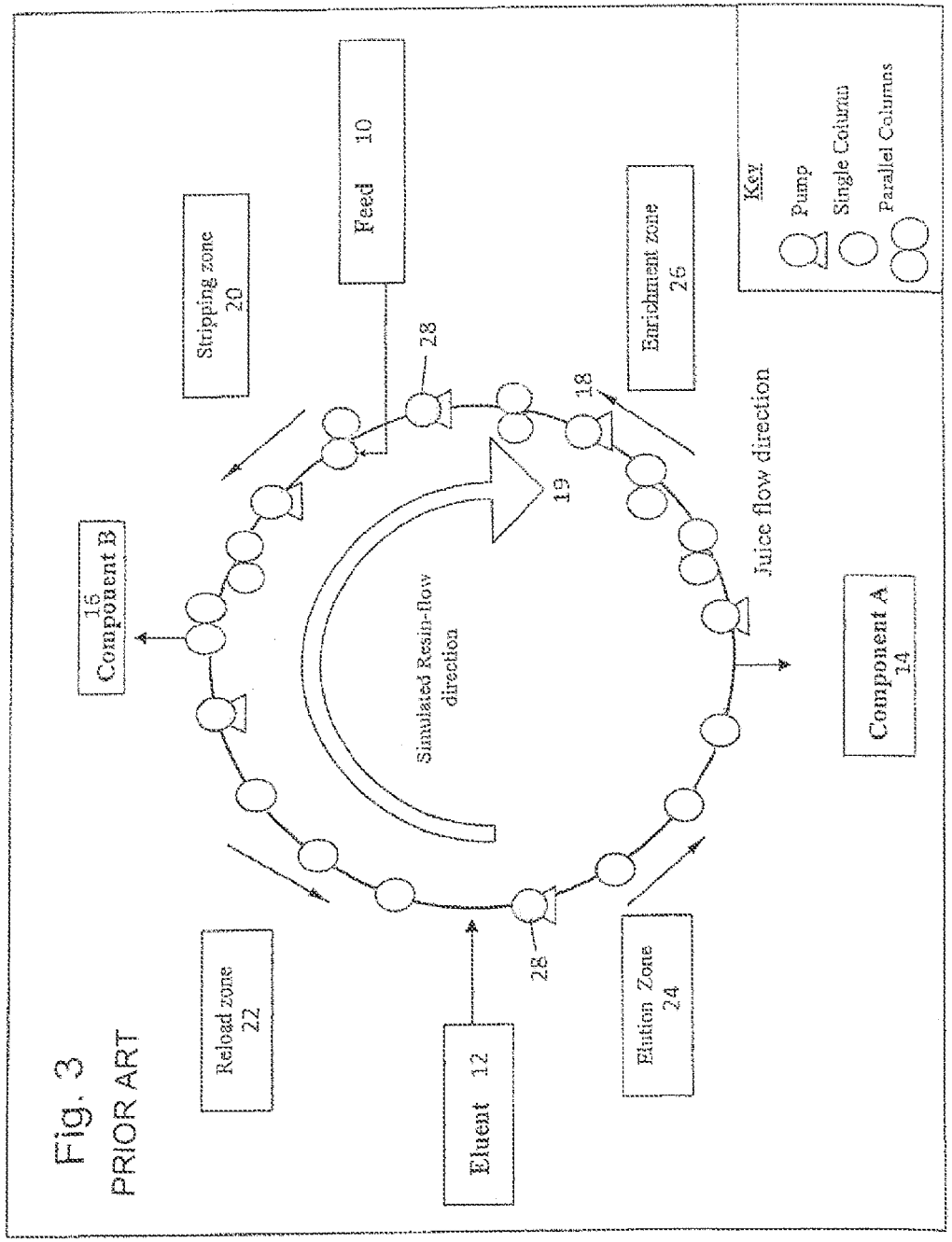
FIG. 3 diagrammatically illustrates the process of FIG. 2 and illustrates typical pump positions.

FIGS. 2 and 3 diagrammatically illustrate a counter-current chromatographic separation process as used in the processing of sugar juice. Persons skilled in this art will be familiar with the various steps in this process as depicted in these Figures, namely the introduction of raw feed at position 10 and of regenerative eluent at position 12 and withdrawal of separated components at positions 14 and 16. The separation columns or vessels are indicated by the numeral 17, the flow direction of the sugar liquor by the numeral 18 and the simulated resin-flow direction by the numeral 19. The respective stripping, reloading, elution and enrichment zones are indicated by the numerals 20, 22, 24 and 26. FIG. 2 also illustrates the typical positions of interstage pumps 28 used to pump the process liquids.

Figure 4:
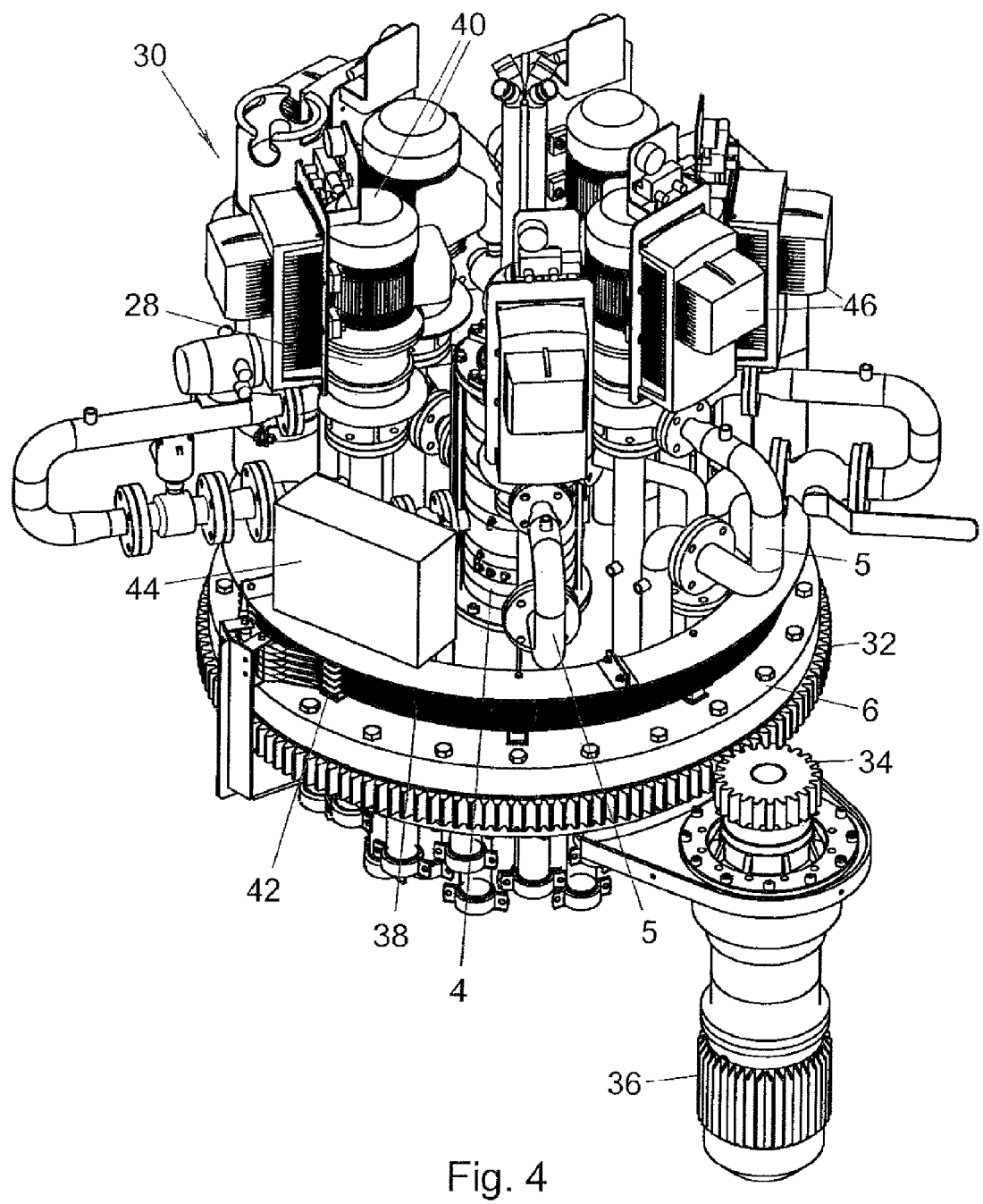
FIG. 4 illustrates relevant components of an apparatus according to the invention.

FIG. 4 illustrates an RDA 30, generally of the kind described above, which includes the pumps 28 mounted for rotation with the rotating components of the RDA in accordance with the invention.

Components in FIG. 4 corresponding to those in FIG. 1 are indicated by the same reference numerals. As illustrated, the rotating components of the RDA, i.e. the shell 4, pipes 5 and indexing disc 6 are fast with a ring gear 32. A spur gear 34 driven by an electric motor 36 meshes with the ring gear in order to rotate the rotary components during operation of the RDA.

A slipring 38 is also mounted fast with the ring gear as shown. This supplies current to electrical motors 40 through contact brushes 42. The electrical motors 40 drive the interstage pumps 28 in the pipes 5 under the control of an electronic control unit 44. The pump speeds are controlled individually, by the control unit, by means of by variable frequency drive units 46 mounted to the motors 40.

By arranging the interstage pumps 28 in the pipes 5, so that they rotate with the other rotating components of the RDA, various advantages can be achieved. In the first place, this allows the individual pumps to follow the profile of the sugar juice or liquor as it moves from column to column. This in turn reduces the number of pumps required and simplifies the sizing of the pumps as well as control of the process because throughout the cycle the pumping load on each pump remains constant.

The invention claimed is:

1. A rotary distribution apparatus for distributing process liquids, the apparatus comprising a core into which fixed process liquid supply pipes extend, annular fluid distribution chambers defined between the core and an outer shell which rotates around the core, rotating pipes which rotate with the shell and which are connected between selected distribution chambers and selected ports in a rotating indexing disc which rotates, with the shell, relative to a stationary indexing disc, whereby as the rotating disc rotates, different streams of process liquid streams fed to the rotating disc through the pipes are introduced to fixed ports in the stationary disc which are arranged to feed the streams selectively to selected destinations, characterised in that interstage pumps operating to pump the process liquids are mounted to rotate about the core with the rotating pipes and the rotating indexing disc.

2. A rotary distribution apparatus according to claim 1 wherein the interstage pumps are arranged to pump process liquids through the rotating pipes.

3. A rotary distribution apparatus according to claim 1 or claim 2 wherein the interstage pumps are driven by electrical motors provided with electrical current, from a current source, by a rotating slipring through contact brushes.

4. A rotary distribution apparatus according to claim 3 comprising a rotating variable frequency drive unit associated with each electrical motor for controlling the speed of the associated pump.

5. A rotary distribution apparatus according to claim 4 comprising wherein the variable frequency drive units are controlled by a common electronic control unit.

6. A method of distributing process liquids for ion exchange or chromatographic separation in the processing of sugar juice in a sugar extraction plant, the method comprising distributing the process liquids using a rotary distribution apparatus comprising a core into which fixed process liquid supply pipes extend, annular fluid distribution chambers defined between the core and an outer shell which rotates around the core, rotating pipes which rotate with the shell and which are connected between selected distribution chambers and selected ports in a rotating indexing disc which rotates, with the shell, relative to a stationary indexing disc, whereby as the rotating disc rotates, different streams of process liquid streams fed to the rotating disc through the pipes are introduced to fixed ports in the stationary disc which are arranged to feed the streams selectively to selected destinations, characterised in that the method comprises the step of mounting interstage pumps to rotate with the rotating pipes and the rotating indexing disc and operating the pumps to pump the process liquids through the rotating pipes.

* * * * *